United States Patent
Wilkinson et al.

(10) Patent No.: US 8,169,515 B2
(45) Date of Patent: May 1, 2012

(54) PROCESSING DATA FROM A CCD AND CCD IMAGING APPARATUS TO CORRECT SMEARING ARTIFACTS

(75) Inventors: Antonio Canas Wilkinson, Surrey (GB); Robert Alan Hoult, Bucks (GB)

(73) Assignee: PerkinElmer Singapore Pte Ltd, Singapore (SG)

( * ) Notice: Subject to any disclaimer, the term of this patent is extended or adjusted under 35 U.S.C. 154(b) by 505 days.

(21) Appl. No.: 12/364,381

(22) Filed: Feb. 2, 2009

(65) Prior Publication Data

US 2009/0174796 A1 Jul. 9, 2009

Related U.S. Application Data

(63) Continuation of application No. 12/140,063, filed on Jun. 16, 2008, now abandoned, which is a continuation of application No. PCT/IB2006/003621, filed on Dec. 14, 2006.

(30) Foreign Application Priority Data

Dec. 16, 2005 (EP) .................................... 05257759

(51) Int. Cl.
  *H04N 9/64* (2006.01)
(52) U.S. Cl. ....................................... 348/248; 348/234
(58) Field of Classification Search ............... 348/223.1, 348/234, 241, 246, 248
  See application file for complete search history.

(56) References Cited

U.S. PATENT DOCUMENTS

| | | | | |
|---|---|---|---|---|
| 5,053,615 A | * | 10/1991 | Patel | 348/248 |
| 5,198,816 A | | 3/1993 | Kalinowski et al. | |
| 5,909,245 A | * | 6/1999 | Aoki et al. | 348/223.1 |
| 2005/0110989 A1 | * | 5/2005 | Schermer et al. | 356/246 |
| 2005/0117038 A1 | | 6/2005 | Matsuyama | |
| 2007/0025636 A1 | * | 2/2007 | Furukawa et al. | 382/275 |
| 2009/0219417 A1 | * | 9/2009 | Tsuruoka | 348/241 |

FOREIGN PATENT DOCUMENTS

EP 0748113 B1 12/1996
(Continued)

OTHER PUBLICATIONS

International Search Report and Written Opinion of the International Searching Authority, May 22, 2006 (13 pages).
(Continued)

*Primary Examiner* — Gevell Selby
(74) *Attorney, Agent, or Firm* — St. Onge Steward Johnston & Reens LLC (57) ABSTRACT

A method of processing data from a CCD 1 having a line of light sensitive CCD elements is provided. The method comprises the steps of receiving measured illumination data readout from the CCD corresponding to measurements of charge associated with each element of the line of light sensitive CCD elements and removing from the measured illumination data in respect of each CCD element a component dependent upon illumination recorded by each of the other CCD elements through which the charge from the CCD element passed during the readout process.

29 Claims, 3 Drawing Sheets

| | FOREIGN PATENT DOCUMENTS | | |
|---|---|---|---|
| EP | 0777380 | A1 | 6/1997 |
| JP | 2051981 | A | 2/1990 |
| JP | 3289278 | A | 12/1991 |
| JP | 9270957 | A | 10/1997 |
| JP | 2000069372 | A | 3/2000 |
| JP | 2005175930 | A | 6/2005 |
| JP | 2006528444 | A | 12/2006 |
| KR | 930004000 | B1 | 5/1993 |
| WO | 2005013605 | A1 | 2/2005 |

OTHER PUBLICATIONS

Australian Office Action (Examiner's First Report); Australian Application No. 2006325021; Dec. 16, 2009; 2 pages.

Korean Office Action—Non-Final Rejection; Korean Application No. 10-2008-7017260; Aug. 18, 2010; 3 pages.

* cited by examiner

PROCESSING DATA FROM A CCD AND CCD IMAGING APPARATUS TO CORRECT SMEARING ARTIFACTS

CROSS-REFERENCE TO RELATED APPLICATIONS

This application is a continuation of U.S. patent application Ser. No. 12/140,063 filed Jun. 16, 2008, now abandoned which in turn is a continuation of International patent application PCT/IB2006/003621 filed on Dec. 14, 2006 which designates the United States and claims priority from European Patent Application No. 05257759.0 filed on Dec. 16, 2005. The content of all prior applications is incorporated herein by reference.

FIELD OF THE INVENTION

The present invention relates to a method of processing data from a CCD and a CCD imaging apparatus. Throughout this document the acronym CCD stands for charge-coupled device.

BACKGROUND OF THE INVENTION

A CCD typically comprises an array of light sensitive CCD elements. These elements are usually formed of a semiconductor material and generate charge when exposed to light of an appropriate frequency. In use, the CCD elements are exposed to incident light for an exposure time during which charge accumulates at the CCD elements. The charge accumulated at a CCD element depends upon the exposure time and intensity of light incident. Subsequent measurement of the charge generated at each CCD element corresponds to a measurement of the light incident on the CCD elements and allows an image to be recorded.

In order to measure the charge generated at each CCD element it is common to transport the charge away from the CCD elements to allow further exposures to be recorded while the recorded data is processed. This process of removing charge from the CCD and measuring it may be referred to as the transport and readout process. In order to transport the charge away it is common to draw the charge down from the array in columns. Thus charge from an element at the top of a column is drawn down through lower CCD elements to be read during the transport and readout process.

CCD devices are used in many imaging applications. In some, such as digital cameras, the CCD is provided behind a shutter. However, in others, such as luminescence and scintillation assay measurement systems, a shutter is not provided. However, the absence of a shutter can cause problems. In systems without a shutter, as the charge is drawn down through adjacent CCD elements during the transport and readout process, the CCD elements are still subject to illumination. This tends to increase the measured charge, particularly in cases where charge has been drawn through several CCD elements during the readout process. Further, this additional exposure time is not uniform for each charge. Charges corresponding to CCD elements at the top of a column are drawn down through several CCD elements during the transport and readout process whereas the charge associated with the lowest CCD element does not pass through any other CCD elements. As the illumination of CCD elements may not be uniform or constant, it is difficult to establish the effect on a charge of having passed through other CCD elements during the transport and readout process.

Figure 1A:
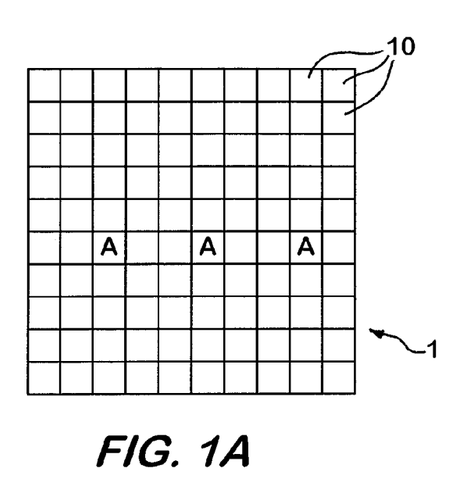
FIG. 1A shows a CCD having CCD elements, upon a few of which a bright light is incident.
Figure 1B:
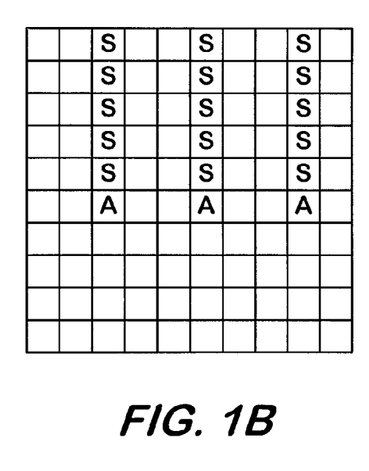
FIG. 1B illustrates smearing of the image recorded by the CCD shown in FIG. 1.

This problem may be illustrated, by way of example, with reference to FIGS. 1A and 1B. FIG. 1A shows a CCD 1 comprising one hundred light sensitive elements 10. The CCD is subject to illumination in 3 "spots" which fall on CCD elements marked A. During the transport and readout process charge is transported from the CCD in vertical columns, when in the configuration shown in FIG. 1B, leaving the CCD at the bottom of the CCD. The resulting image formed from the CCD data using standard processing is shown in FIG. 1B. As can be seen the three bright spots A have been recorded. However, there are also smears marked S which rather than showing unexposed areas show exposure. The smears S are due to charge accumulated as the charge from the CCD elements above the brightly exposed elements are drawn through the exposed elements during the transport and readout process. This problem of false image data caused by the transport and readout process is referred to as smearing.

As mentioned above, once the charge has been drawn from the CCD in columns a further exposure may begin. Alternatively, further current may be drawn down the columns, possibly more rapidly, in order to further "clear" the sensor prior to the next exposure. This process is known as clearing.

Another problem that may distort the recorded illumination data, is residual charge left during this clearing process. During clearing, current is drawn down the CCD in columns while the illumination still present. Because, the lower CCD elements receive charge accumulated in the CCD elements above them during the clearout process, the clearout process tends to leave more charge in the lower CCD elements than in the upper CCD elements. In some circumstances, this accumulation of charge may partially compensate for the smearing process described above. An uneven distribution of charge at the beginning of the exposure may also be a result of an incomplete or uneven clearout process after which an irregular concentration of charge is left at the CCD elements.

A known method of processing data from a CCD to reduce the effect of smearing on an image is linear offset approximation. If, for example in a scintillation assay, the CCD is arranged to measure light emitted from an array of wells, a lower portion of the CCD may be directed to view an area below the lowest well in the array and an upper portion of the CCD may be directed to view an area above the highest well in the array. Because no light is expected to be generated outside of the wells, it is expected that neither the upper nor lower portions of the CCD will be exposed. Due to the smearing effect described above, illumination data relating to the upper portion of the CCD may show some exposure due to smearing. In order to compensate for this artificial exposure, a measurement is taken of the exposure of the upper and lower portions of the CCD that were expected to be unexposed. The difference in exposure between the upper and lower portions of the CCD due to smearing is then measured and an offset is applied to the recorded data for each row of CCD elements equal to the measured exposure difference divided by the number of CCD elements between the upper and lower portions and multiplied by the number of rows of elements beneath that row.

The linear offset method assumes that the smearing is generated evenly throughout the CCD and works well when the illumination of the CCD is relatively uniform, for example when the wells of a scintillation assay measurement system are uniformly filled and each give out the same amount of light. However, when the exposure is non-uniform, such as that shown in FIG. 1A, the method tends to generate negative readings for those cells below the bright points of illumination and fails to fully compensate for the smearing above the bright points of illumination.

An object of the present invention is to provide a method of processing data from a CCD and a CCD imaging apparatus that tends to better compensate for the effect of the smearing described above.

SUMMARY OF THE INVENTION

According to a first aspect of the present invention there is provided a method of processing data from a CCD having a line of light sensitive CCD elements, comprising the steps of:

receiving measured illumination data readout from the CCD corresponding to a measurements of charge associated with each element of the line of light sensitive CCD elements; and removing from the measured illumination data in respect of each CCD element a component dependent upon the illumination recorded by each of the other CCD elements through which the charge from the CCD element passed during the readout process.

By removing components of the illumination recorded by other CCD elements, the problem of overcompensating in parts of the image and under compensating in others may be reduced.

Preferably, the component of the illumination recorded by each of the other CCD elements removed from the CCD element is proportional to the measured illumination from each of the other CCD elements through which the charge from the CCD element passed during the reading process.

In some embodiments the method may comprise the step of treating the recorded data for the lowest element, through which lowest element charge is drawn from the CCD, as equal to a calculated illumination for the lowest CCD element. This may be done as it is sensible to assume that there is no smearing in the recorded data associated with the lowest element because the charge associated with the lowest element does not pass through any other CCD elements. The method may comprise the step of subtracting an offset from the measured illumination data associated with the lowest CCD element before treating the resulting data for the lowest CCD element as equal to a calculated illumination value. The offset may compensate for clearing effects present in the measured illumination data. The method may further comprise the steps of calculating, for each successive element of line of CCD elements starting with the second lowest CCD element, a calculated illumination by subtracting a component of the calculated illumination associated with each of the lower CCD elements.

In other embodiments the step of removing from the measured illumination data in respect of each CCD element a component dependent upon the illumination recorded by each of the other CCD elements may comprise the step of subtracting a quantity substantially equal to the integral of the product of a measured illumination data function and a kernel function over the region below the CCD element. The illumination function is a function that represents the measured illumination data in continuous form.

If the CCD elements do not have uniform sensitivity, the kernel function may be selected to compensate for non-uniform sensitivity of the line of CCD elements.

In some cases the kernel function may be unknown. In some cases, the kernel function may be approximated to a constant kernel parameter, k.

In cases where the kernel parameter is unknown, the method may comprise the step of determining the kernel parameter, k.

Preferably, the CCD comprises an array of CCD elements. The array of CCD elements may be formed of a plurality of columns of CCD elements of which the line of CCD elements forms one. In some embodiments, the kernel parameter, k, may be calculated on a column by column basis. In other embodiments, k may be determined for all CCD elements forming the array.

Preferably, some CCD elements are selected as reference elements and an expected illumination value is determined for these reference elements. The reference elements may be CCD elements that have been masked. In this case, it is expected that the reference elements will not have been subject to illumination.

The step of determining the kernel parameter, k, may comprise the step of
1. selecting a value of the kernel parameter;
2. processing illumination data according to a method described above in order to generate calculated data, and
2. inspecting the calculated data in order to determine whether the calculated illumination data corresponding to the reference elements has the expected illumination values.

The method may further include the step of varying the kernel parameter and repeating steps above until the calculated data relating to the reference elements has the expected values to within a predetermined tolerance.

The method above may also comprise the step of selecting an initial value of the kernel parameter that is of larger magnitude than an expected kernel parameter value. The expected kernel parameter value is an estimate or guess at the kernel parameter value that will yield expected values for the data corresponding to the reference elements. The method may then comprise the step of varying the kernel parameter to find a kernel parameter of least magnitude to within an acceptable tolerance that yields the expected value for the reference elements to within an acceptable tolerance. The kernel parameter may be varied in accordance with known root finding methods such as bisection, Newton-Raphson derivatives etc.

Where this method of determining the kernel value is performed on a column by column basis, the method may comprise the step of selecting one or more columns that have been exposed to a relatively high quantity of light and calculating the kernel parameter for these high signal columns in preference to other columns. Preferably, the method then comprises the step of processing the remaining columns. In some embodiments, if the measured illumination data for the reference elements within a column is within a tolerance range of the expected value, no further processing of that column is conducted. In other embodiments, if the measured illumination data for the reference elements within a column is within a tolerance range of the expected illumination values, the column is processed using a default value of the kernel parameter. The default value of the kernel parameter may be a value of the kernel parameter determined from processing of the kernel parameters calculated during processing of the high signal data columns.

Another, method of calculating how much of a component of the other CCD elements should be removed from the illumination data, is a matrix treatment. If data associated with each column of the CCD array is treated as a vector, then the illumination data generated by the CCD including the smearing effect may be treated as the actual illumination of the CCD, as a vector, acted on by a matrix operator which represents the process of measurement by the CCD. In some embodiments, the step of removing from the measured illumination data in respect of each CCD element a component dependent upon the illumination recorded by each of the other CCD elements may comprise the step of treating the illumination data from a line of CCD elements as a vector and pre-multiplying the vector by a matrix. Preferably the matrix is an approximation of the inverse of a matrix operator that represents the measurement of illumination by the CCD.

Preferably, the approximation of the inverse of the matrix operator is obtained by inverting an approximation of the matrix operator. In some embodiments, the inversion of the matrix operator is performed using a numerical method, such as singular value decomposition.

In one representation of the matrix operator, the matrix operator is an N by N matrix, where N is equal to the number of CCD elements in a column, and the diagonal elements of the matrix contain constants associated with exposure time. In some embodiments, the diagonal elements each contain a single constant associated with exposure time. Preferably, the elements of the matrix operator below the diagonal contain constants associated with smearing due to the read-out process. In some embodiments, the elements of the matrix below the diagonal contain a single constant associated with smearing during readout. Preferably, elements of the matrix above the diagonal contain constants associated with pre-exposure of the CCD elements during clearing. In some embodiments, the elements of the matrix above the diagonal each contain a single constant associated with pre-exposure of the CCD elements during clearing.

In some methods, the matrix operator is estimated based on knowledge of the exposure time of the CCD, the read-out time of the CCD and the clearing patterns of the CCD.

Preferably, the data is processed based on an estimated matrix operator and then data associated with reference elements is examined to see whether the data associated with the reference elements is within a tolerance range of an expected value. In an iterative method, if the processed data associated with the reference elements is not within the tolerance range, the matrix operator is adjusted and the process is repeated until the data associated with the reference elements is within the tolerance range.

In some embodiments, an initial matrix operator is estimated and the above iterative method is used with a vector representing illumination data in which each element of the column vector corresponds to a weighted average of data from CCD elements in an associated row of the CCD. In some embodiments, the weighted average is calculated so as to lend greater weight to data, associated with columns of the CCD, which have significant smearing.

In some embodiments, the matrix operator may be adjusted to compensate for non-uniform sensitivity of the CCD elements by multiplying each row of the matrix operator by a sensitivity factor.

A CCD imaging apparatus may be provided comprising:
a CCD having a line of light sensitive CCD elements;
measuring means for measuring charges associated with the CCD elements to generate measured illumination data; and
processing means for removing from each element of the measured illumination data in respect of each CCD a component of the illumination recorded by each of the other CCD elements through which the charge from the CCD element passed during the readout process.

Optional features of the first aspect of the present invention described above, may also optionally be features of the second aspect of the present invention.

BRIEF DESCRIPTION OF THE DRAWINGS

Methods of processing data from a CCD and a CCD imaging apparatus will now be described, by way of example only, with reference to the accompanying drawings in which.

DETAILED DESCRIPTION OF THE INVENTION

Figure 2:
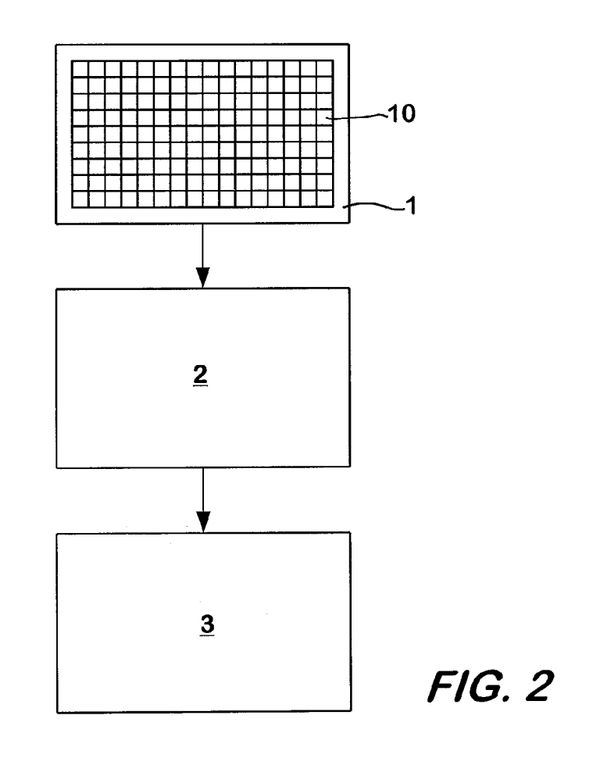
FIG. 2 schematically shows a CCD imaging apparatus embodying the present invention.

FIG. 2 shows a CCD imaging apparatus comprising a CCD 1, which has an array of CCD elements 10. The CCD is under constant illumination and is not provided behind a shutter. The CCD 1 is connected to measuring means in the form of an analogue to digital converter (ADC) 2 for measuring charges accumulated at the CCD elements 10. In general, the measuring means may be formed as part of the CCD or may be a separate device. The ADC 2 is connected to processing means in the form of a processor 3 for processing image data received from the ADC 2.

Image data generated by the ADC 2 is subject to distortion due to smearing and due to charge density differences at the start of the CCD exposure caused by clearing. The effect of smearing and clearing on the data depends to some extent on the relative duration of the exposure, readout and clearing of the CCD 1. In this embodiment, the exposure time is around 400 ms, the readout time is around 600 ms and the clearing time is around 100 ms.

Smearing tends to become a greater problem as the readout time becomes large compared with the exposure time. Thus if the exposure time is reduced to 4 ms to increase the cycle time of the CCD, smearing effects would dominate the image data produced by ADC 2. A similar effect occurs if the readout time is increased, perhaps to reduce noise introduced to the image signal during readout. On the other hand increasing the exposure time relative to the readout time, reduces the relative effect of smearing on the resulting image.

The processor 3 may process data according to either of the following methods to at least partially compensate for distortion due to smearing or clearing.

First Embodiment

Consider a single column of the CCD elements 10 in the CCD 1 that are initially subject to illumination for an exposure time. The CCD elements are arranged such that, during a transport and read out process, current associated with each CCD element is drawn down the column and out via the lowest element. In this case, if the CCD elements are numbered from the bottom up, charge from the yth CCD element passes through the y-1 CCD elements below it during the transport and read out process. Illumination of this column of CCD elements is in general non-uniform and may be represented by an illumination function X(y). In view of the above, the recorded illumination for the yth CCD element is due to illumination of the yth CCD element during the exposure time and also due to illumination as the charge associated with the yth CCD element passes through y-1 lower CCD elements during the transport and read out process. For a large number of CCD elements $$I(y) = X(y) - k \int_0^y X(z)\,dz$$

where I(y) is a recorded illumination function representing data recorded by ADC 2 and k is the parameter known as the kernel parameter. The function X(y) represents illumination during the exposure time. The kernel, k, may, more generally, be a function that varies along the column of CCD elements, for example where the readout process is non-uniform. In the case where the kernel varies spatially, the kernel function should be taken inside the integral. The integral term represents charge accumulated as the charge associated with the CCD element at y passes through lower CCD elements. Because we expect the final recorded data to represent a sum of the illumination during exposure and accumulation as the charge passes through the elements below it, it can be seen that k must be a negative constant in the present case.

The above equation may be rearranged as follows:

$$X(y) = k \int_0^y X(z)dz + I(y)$$

This equation is recognisable as a volterra integral equation for which there exist standard solutions. Alternatively, the problem may be couched in discrete terms leading to the following equation:

$$I_y = X_y - K \sum_{i=o}^{y-1} X_i$$

Of course, the only known function in the above equations is the recorded CCD image data I(y) or $I_y$. However, inspection of these equations shows that where y=0 in the continuous case or where y=1 in the discrete case, the sum or cumulative integral vanishes indicating that there is no smearing in respect of the lowest CCD element. This is because charge from the lowest element does not pass through any CCD elements below it. Looking particularly at the discrete equation one can therefore by setting $X_1$ equal to $I_1$ and estimate that the next illumination, $X_2$, will be equal to:

$$X_2 = I_2 - kX_1.$$

It can be seen that the illumination function, $X_y$, may be, therefore, be estimated iteratively, by repeating the above steps for $X_3 X_4 \ldots X_n$ where n is equal to the number of CCD elements in the column of the CCD. At this stage, the only remaining unknown is, therefore, the kernel parameter.

A method of processing data according to the first embodiment of the present invention consists of the steps of assuming that the lowest CCD element of a column of CCD elements does not contain any smearing, removing from the measured data associated with the CCD element above the lowest element a weighted component of the data corresponding the lowest CCD element, removing from the $3^{rd}$ highest CCD element a weighted component of the recorded data relating to the lowest CCD element and a weighted component of the calculated illumination data for the intermediate CCD element, and so on until an estimate of the illumination function has been calculated for all CCD elements. This, of course, could be repeated on a column by column basis for an array of CCD elements.

Figure 3:
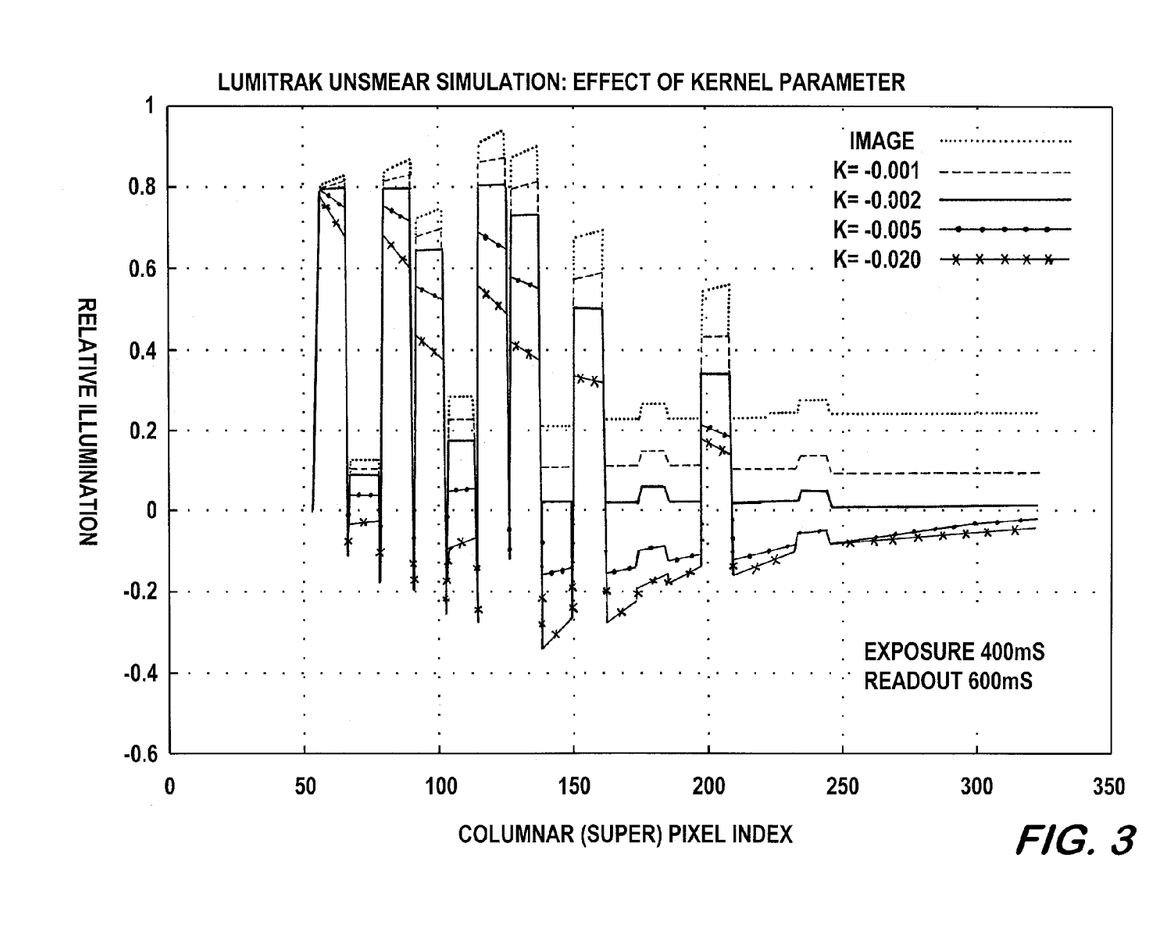
FIG. 3 is a graph showing how the varying the value of the kernel parameter, k, affects the data produced by a method of the first embodiment.

The next step is the determination of k, the kernel parameter. FIG. 3 shows the effect of applying a method according to the first embodiment to simulated measured image data that includes the effect of smearing. The measured image data is shown in FIG. 3 by a dotted line marked "image". This image data was generated for a CCD comprising a column of CCD elements (pixels) that was subject to illumination in spots. Looking at the graph it can be seen that the spots have produced sharp point like peaks of high illumination.

In order to allow an appropriate value of k to be determined, the upper edge of the CCD used to produce this image data was masked. The masked CCD elements for which an expected illumination is known, may be referred to as reference elements. Looking at the graph, where the image data forms a substantially flat line beyond columnar pixel index 250 the flat line represents the reference pixels that were subject to no illumination. However, looking at the graph it can be seen that, due to smearing, the relative illumination of the reference pixels is in fact above zero and somewhere beyond 0.2. Application of the above method using a value of k=−0.01 can be seen to reduce the effect of smearing, lowering the height of the flattened end section of the image date to a relative illumination below 0.2. However, a better fit appears to be provided by lowering the kernel parameter further to −0.002 in which case the flattened end portion is bought to nearly zero relative illumination. This corresponds to the expected zero illumination due to masking of the CCD elements.

Looking at the results for K=−0.005 and K=−0.020 the effect of selecting a kernel parameter of too large a magnitude (too negative) can be seen. When too large a magnitude of the kernel parameter is selected the resulting image data tends to be distorted and negative illumination values appear.

A method of determining an appropriate value of the kernel parameter k is therefore to select an area of the CCD for which illumination is known (select reference elements) and to perform image processing according to the above described method using different values of k until the resulting data for the reference elements matches the expected illumination value to within a required tolerance.

Looking at FIG. 3 it can be seen that for values of k that are too negative, the flattened end portion of the calculated data still tends towards zero relative illumination. The optimal value of k therefore appears to be the value of smallest magnitude that yields near zero relative illumination for the reference elements. This may be done by initially selecting a kernel parameter that is too large in magnitude (too negative) and then adjusting the kernel parameter to find a minimum magnitude of k that yields an acceptable solution. This is effectively a problem of finding a root of an equation and may be solved using conventional methods such as bi-section, Ridder's algorithm, Newton-Raphson derivatives or Brent's method (van Wijngaarden-Dekker-Brent)

A further development of this method involves the use of reference elements provided at the bottom of the CCD as well as at the top. The CCD may be subject to the effects of residual exposure of the CCD elements from clearing. This effect may be seen in the lowest elements of the CCD columns where no smearing is present. In order to compensate for the clearing, an offset may be applied to the data for a column of CCDs to bring the reference elements at the bottom of the CCD to there expected value before applying the method described above.

Figure 4:
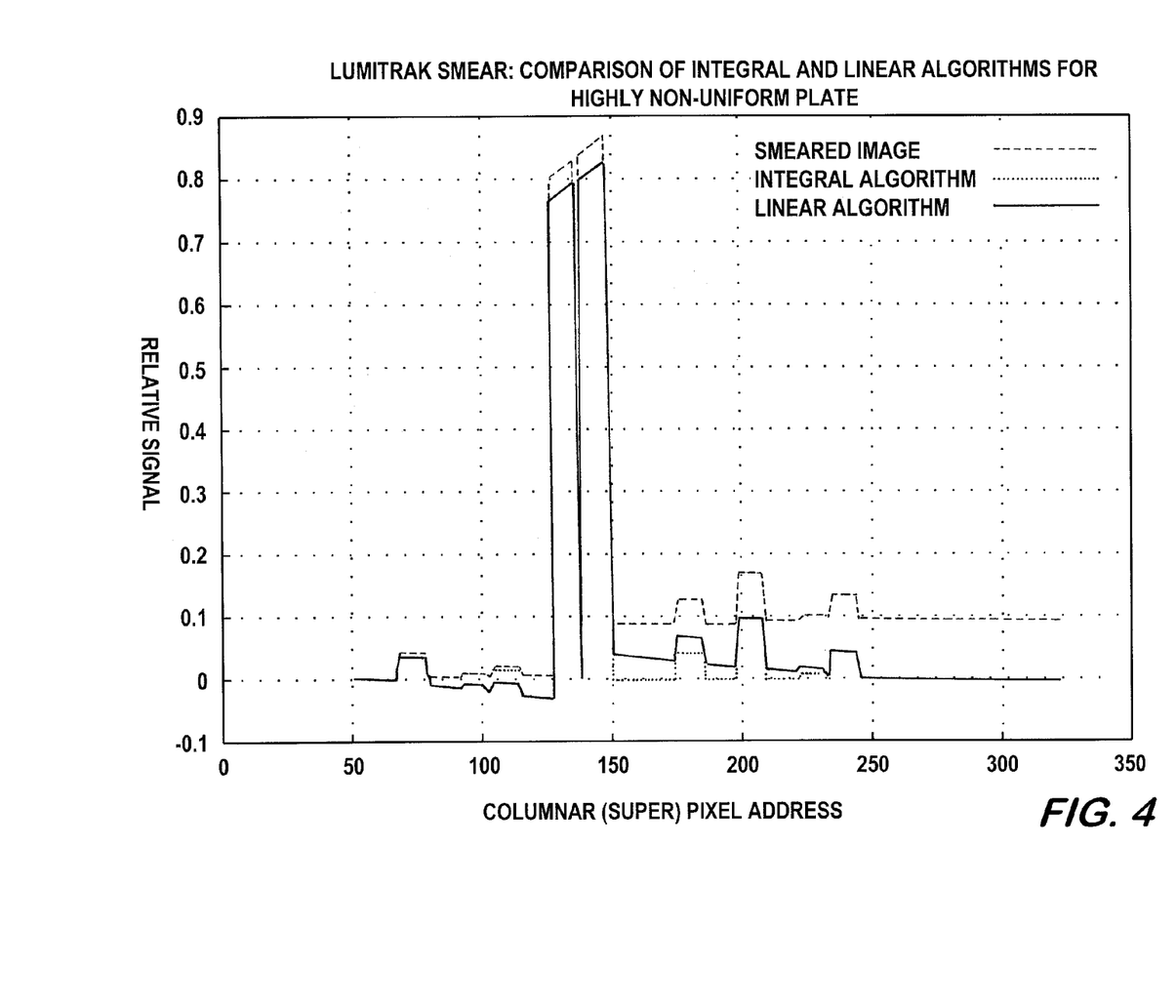
FIG. 4 is a graph showing the effect of the linear offset method and the method of the first embodiment of the present invention on simulated smeared image data.

Application of the above method has been found to be very effective. FIG. 4 is a graph showing simulated smeared image data, image data calculated using the integral algorithm described above and data calculated using the linear approximation method (linear algorithm) described in the introduction to this application. Again the smeared image data has been formed for a CCD that is masked at its upper elements. Thus, the relative signal for columnar pixels above 250 should be zero representing no recorded illumination. Looking at the smeared image data it can be seen that due to smearing the recorded relative signal for columnar pixels above 250 is just below 0.1. This situation is somewhat improved by the linear approximation method. However, looking at the data produced by the integral algorithm it can be seen that this data produces a much flatter background and avoids negative signal readings that are produced by the linear algorithm (see for example between columnar pixels 50 and 125).

In a variant of the first embodiment, if the CCD is used for multiple exposures then the value of the kernel parameter calculated for earlier exposures may be used to estimate the kernel parameter for later exposures. If the exposure times for the different exposures vary, the value of the kernel parameter, k, may be scaled by a factor proportional to the exposure times and readout times of the different exposures.

The method of the first embodiment has the potential, in some circumstances, to yield negative data values. To compensate for this, the final image data may have an offset added to it and be rescaled before display to a user to prevent clipping of the image data during display.

Second Embodiment

In a second method embodying the present invention, the recorded illumination data, which represents the actual illumination of the CCD, is treated as original illumination data acted on by a matrix operator. The recorded data may be arranged as a column vector $I$. Correspondingly, the original illumination data may be arranged as a column vector X. The recorded illumination data is regarded as the original illumination data acted on by a matrix operator, M, that represents the action of the CCD during pre-exposure, clearing exposure and read out. Thus $$\vec{I} = M \cdot \vec{X}$$

In the absence of smearing or clearing effects the original illumination data, X, would be equal to the recorded illumination I multiplied by a constant relating to exposure. Thus the diagonal elements of the matrix operator M include a constant relating to the exposure time, E. Other elements in the matrix are included to represent smearing and clearing effects. In general, the entries for clearing effects may be represented by constants $C_{ij}$. However, if the constants associated with pre-exposure due to clearing may be represented by a single constant C and terms relating to smearing are represented by constant R then the form of the matrix M is:

$$M = \begin{pmatrix} E & C & C & \cdots & C \\ R & E & & & \vdots \\ R & & \ddots & & C \\ \vdots & & & E & C \\ R & \cdots & R & R & E \end{pmatrix}$$

As discussed in the introduction to this application the pre-exposure due to clearing may be irregular due to incomplete clearing or possibly due to significant pauses during the clearing process. In these circumstances and as mentioned above, the constant C in the matrix M may not be a satisfactory approximation and it will be appropriate to use different values $C_{ij}$. If the CCD elements in a column are not of uniform sensitivity this may be compensated for by multiplying the rows of the Matrix M by appropriate sensitivity factors.

If the above matrix with a clearing constant C is substituted into the matrix equation above and multiplied out then the result is the discrete equation formulated earlier in respect of the method of the first embodiment except for the presence of terms involving constant C which relate to clearing. Thus, if terms involving C are small enough to be ignored the solution of the above equation will produce exactly the same result as the integral method of the first embodiment.

The matrix M may be written in lower diagonal form by representing M as the sum of two matrices as follows:

$$M = M^{LD} + C$$

$$M = \begin{pmatrix} E-C & 0 & 0 & \cdots & 0 \\ R-C & E-C & & & \vdots \\ R-C & & \ddots & & 0 \\ \vdots & & & E-C & 0 \\ R-C & \cdots & R-C & R-C & E-C \end{pmatrix} + \begin{pmatrix} C & C & \cdots & C & C \\ C & C & & & C \\ \vdots & & \ddots & & \vdots \\ C & & & C & C \\ C & C & \cdots & C & C \end{pmatrix}$$

If we insert this representation of the Matrix, M, and multiply matrices out, we arrive at:

$$I = MX = (M^{LD} + C)X = M^{LD}X + CX$$

The above equation, where pre-clearing is uniform i.e. $C_{ij}=C$, may be solved by subtracting an offset from each column and the use of the method of the first embodiment. This offset can be estimated using various methods. If, for example, the lowest CCD elements are reference elements that are not subject to exposure then no smearing effect will be present. The difference between the recorded value and the expected zero illumination is therefore due to clearing effects and may be used to calculate the offset C. Having determined C in this manner this value may be subtracted from all the column data before implementing the method according to the first embodiment.

A second special case exists when the effect of read out and pre exposure constants are approximately equal. In this case it can be seen from the equation above that the effect of smearing and clearing cancel each other out and the lower diagonal matrix becomes diagonal. In this situation the solution of the above equation lies in simply removing an offset from each column as described above to compensate for the presence of C in the diagonal terms of the matrix.

It has been found that in practice even if the assumption of the uniform pre-clearing (C=constant) is not valid the application of the integral algorithm according to the first embodiment with the offset described above is likely to give a good first order solution of the above equations with relatively little computational effort. Application of this method therefore produces data with substantially less smearing and clearing distortion.

In the event that the value of C may not be treated as a constant it has to be replaced by constants $C_{ij}$, more sophisticated methods may be employed. Returning to the matrix equation $$\vec{I} = M \cdot \vec{X}$$

we may premultiply both sides of the equation by the inverse of matrix M. The resulting equation is:

$$M^{-1} \cdot \vec{I} = M^{-1} \cdot M \cdot \vec{X} = \vec{X}$$

Thus as would be expected, the actual illumination data may be recovered if we can apply an inverse of the matrix M, which represents action of the CCD, to the measured illumination data. Applying this idea presents two problems:
- determining the matrix M from knowledge of CCD operating conditions and without prior knowledge of illumination X, and
- inversion of the matrix M.

Inversion of the matrix M may pose particular problems when the CCD is large and consequently the matrix M has a large number of elements. The inversion of the matrix M, once it has been determined, may be accomplished by various known methods. One preferred method is that of singular value decomposition. This method has the advantage that the user may determine when the inversion is likely to become numerically unstable and make a good approximation to the solution.

The structure of the matrix M, may be determined as follows. Initial estimates may be determined based on knowledge of the time taken by the CCD during exposure, readout and clearing. These estimates are likely to allow a good first approximation to the structure of the matrix M, using a formulation similar to that described above.

The matrix, M, may then be adapted by applying the above method to measured illumination data for a known illumination pattern. Iterative adaptation of the matrix M based on inspection of the calculated illumination data and the known illumination pattern allows refinement of the matrix M to an acceptable approximation.

The above method could be applied in a column by column approach to determine a matrix relating to each column of the CCD. An alternative approach is to apply the above method to more than one column of a CCD at once.

If the original illumination data and recorded illumination data are considered for multiple columns at the same time, a weighted average illumination data column vector and weighted average recorded illumination data vector may be formed. The equation I=M·X may be written in the form:

$$\sum_{i=0}^{N} w_i \vec{I}_i = \sum_{i=0}^{N} w_i M \cdot \vec{X}_i$$

In the above equation the summations are carried over the N columns of the image and i represents a row index. The term w is a weighting factor. If it is assumed that the effect of clearing and readout is the same for each column then M is a constant that may be taken outside the summation. At the same time both sides of the equation are multiplied by the inverse of the matrix to arrive at the following equation:

$$M^{-1} \cdot \sum_{i=0}^{N} w_i \vec{I}_i = \sum_{i=0}^{N} w_i \vec{X}_i$$

In order to obtain a reasonable approximation of the matrix M, the following method is employed using a CCD with masked reference elements at the top and bottom of each column of CCD elements. The weighting factor w is adjusted to produce the sum of those columns which have a strong smear. This may be determined for example by looking at the data corresponding to reference elements at the top of the CCD columns. The left hand sum is then computed to arrive at an averaged column image containing a significant amount of smeared data. Using this averaged column data an estimate of the transform matrix M is made. This matrix is then inverted and calculated illumination data produced. The calculated data corresponding to the reference elements at the top and bottom of the column is then inspected. In this example, data for the reference elements should show no exposure due to masking of the CCD. If, looking at data relating to the masked region at the top of the columns of the CCD, the data is not close to zero then the smearing has not been corrected properly. In this case it is necessary to adjust the value of the constant R in the matrix. Similarly, if, looking at data corresponding to CCD elements in the masked region at the bottom of the CCD, the measured average data does not have a zero mean value then there are still effects of clearing present and the terms $C_{IJ}$ in the matrix need to be adjusted. Once these adjustments have been made a new inverse matrix is calculated and recorded image data is processed again and the values associated with reference elements compared again. This process is repeated in an iterative manner until a stable solution is reached.

What is claimed is:

1. A method of processing data from a CCD having at least one line of light sensitive CCD elements, comprising the steps of:
   - receiving measured illumination data readout from the CCD corresponding to a measurements of charge associated with each element of the line of light sensitive CCD elements;
   - removing from the measured illumination data in respect of each CCD element a component dependent upon the illumination recorded by each of the other CCD elements through which the charge from the CCD element passed during the readout process; and
   - treating the illumination recorded for a lowest element, through which element charge is drawn from the line of CCD elements, as equal to a calculated illumination for the lowest CCD element.

2. A method according to claim 1, wherein the method further comprises the steps of calculating, for each successive element starting with the second lowest CCD element, a calculated illumination by subtracting a component of the calculated illumination associated with each of the lower CCD elements.

3. A method according to claim 2, wherein the method comprises the step of subtracting an offset from the measured data associated with the lowest CCD element before treating the resulting data for the lowest CCD element as equal to the calculated illumination for the lowest CCD element.

4. A method according to claim 1, wherein the CCD comprises an array of CCD elements.

5. A method according to claim 4, wherein the array of CCD elements forms a plurality of columns of which the line of CCD elements is one.

6. A non-transitory computer readable medium having stored thereon a computer program comprising a set of instructions that, when run on processing means, performs a method according to claim 1.

7. A method of processing data from a CCD having at least one line of light sensitive CCD elements, comprising the steps of:
   - receiving measured illumination data readout from the CCD corresponding to a measurements of charge associated with each element of the line of light sensitive CCD elements; and
   - removing from the measured illumination data in respect of each CCD element a component dependent upon the illumination recorded by each of the other CCD elements through which the charge from the CCD element passed during the readout process and removing from each CCD element a quantity approximately equal to the integral of the product of a measured illumination data function and a kernel function over the region below the CCD element.

8. A method according to claim 7, wherein the kernel function is selected to compensate for non-uniform sensitivity of the line of CCD elements.

9. A method according to claim 7, wherein the kernel function is a constant kernel parameter.

10. A method according to claim 9, wherein the CCD comprises an array of CCD elements, wherein the array of CCD elements forms a plurality of columns of which the line of CCD elements is one, and wherein the kernel parameter is calculated on a column by column basis.

11. A method according to claim 9, wherein a global kernel parameter is calculated for processing the measured illumination data.

12. A method according to claim 10, comprising the step of selecting one or more columns that have been exposed to relatively high quantities of light and calculating the kernel parameter for these columns in preference to other columns.

13. A method according to claim 12, comprising the step of subsequently calculating kernel parameters for the remaining columns.

14. A method according to claim 10, wherein some CCD elements are selected as reference elements and expected illumination values are determined for these reference elements, and wherein if the measured illumination data for the reference elements in a column of CCD elements is within a tolerance range of the expected illumination values, the kernel parameter is set to zero such that no component of the calculated illumination data associated with lower CCD elements is removed from the measured illumination data for CCD elements within the column.

15. A method according to claim 12, wherein some CCD elements are selected as reference elements and expected illumination values are determined for these reference elements, and wherein if the measured illumination data for the reference elements in a column of CCD elements is within a tolerance range of the expected illumination values, a default value of the kernel parameter is used.

16. A method according to claim 15, wherein the default value is a value of the kernel parameter determined from kernel parameters calculated during the processing of high signal data columns.

17. A method of processing data from a CCD having at least one line of light sensitive CCD elements, comprising the steps of:
receiving measured illumination data readout from the CCD corresponding to a measurements of charge associated with each element of the line of light sensitive CCD elements:
removing from the measured illumination data in respect of each CCD element a component dependent upon the illumination recorded by each of the other CCD elements through which the charge from the CCD element passed during the readout process;
wherein some CCD elements are selected as reference elements and expected illumination values are determined for these reference elements and the reference elements are masked elements that are expected not to be subject to illumination; and
removing from each CCD element a quantity substantially equal to the integral of the product of a measured illumination data function and a kernel function over the region below the CCD element; and
wherein the method further comprises the steps of:
1) selecting a value of the kernel parameter;
2) processing illumination data to generate calculated illumination data; and
3) inspecting the calculated data in order to determine whether the calculated illumination data corresponding to the reference elements has the expected illumination values.

18. A method according to claim 17, further comprising the step of
4) varying the value of the kernel parameter, and
5) repeating steps 1 to 4 until the calculated data relating to the reference elements has the expected illumination values to within a predetermined tolerance.

19. A method according to claim 17, wherein the step of selecting an initial value of the kernel parameter comprises the step of selecting a kernel parameter that is of large magnitude than an expected kernel parameter.

20. A method of processing data from a CCD having at least one line of light sensitive CCD elements, comprising the steps of:
receiving measured illumination data readout from the CCD corresponding to a measurements of charge associated with each element of the line of light sensitive CCD elements;
removing from the measured illumination data in respect of each CCD element a component dependent upon the illumination recorded by each of the other CCD elements through which the charge from the CCD element passed during the readout process; and
treating the illumination data from the line of CCD elements as a vector and pre-multiplying the vector by a matrix.

21. A method according to claim 20, wherein the matrix is an approximation of the inverse of a matrix operator that represents the measurement of illumination by the CCD.

22. A method according to claim 21, wherein the approximation of the inverse of the matrix operator is obtained by inverting an approximation of the matrix operator.

23. A method according to claim 22 wherein the matrix operator is estimated based on knowledge of the exposure time of the CCD, the read-out time of the CCD and clearing patterns of the CCD.

24. A method according to claim 21, wherein some CCD elements are selected as reference elements and expected illumination values are determined for these reference elements.

25. A method according to claim 24, further comprising the steps of
1) processing data using the estimated matrix to generate calculated illumination data, and
2) inspecting the calculated illumination data to see if the data corresponding to the reference elements has the expected illumination values.

26. A method according to claim 25, further comprising the steps of:
3) varying the estimated matrix
4) repeating steps 1 to 3 until the calculated data associated with the reference elements has the expected illumination values to within a predetermined tolerance.

27. A method according to claim 26, wherein the CCD comprises an array of CCD elements arranged in rows and columns, and steps 1 to 3 are performed using a vector corresponding to a weighted average of data from CCD elements in an associated row of the CCD.

28. A method according to claim 27, wherein the weighted average is calculated so as to lend greater weight to data corresponding to those columns of the CCD that have been subject to relatively high quantities of light.

29. A method according to claim 27, wherein the matrix operator is adjusted to compensate for non-uniform sensitivity of the CCD elements by multiplying each row of the matrix by a sensitivity factor.

* * * * *